United States Patent
Cave et al.

(10) Patent No.: US 7,715,848 B2
(45) Date of Patent: May 11, 2010

(54) INTEGRATED CIRCUIT FOR OPTIMIZING ACCESS POINT CHANNEL SELECTION

(75) Inventors: Christopher R. Cave, Montreal (CA); Angelo A. Cuffaro, Laval, CA (US); Paul Marinier, Brossard (CA); Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 12/356,882

(22) Filed: Jan. 21, 2009

(65) Prior Publication Data

US 2009/0122757 A1 May 14, 2009

Related U.S. Application Data

(60) Continuation of application No. 11/489,043, filed on Jul. 18, 2006, now Pat. No. 7,493,123, which is a division of application No. 10/983,207, filed on Nov. 5, 2004, now Pat. No. 7,454,214.

(60) Provisional application No. 60/526,134, filed on Dec. 1, 2003, provisional application No. 60/535,447, filed on Jan. 8, 2004.

(51) Int. Cl.
H04Q 7/20 (2006.01)
(52) U.S. Cl. .................. 455/453; 455/450; 455/452.2; 455/423; 455/452.1; 370/330; 370/328; 370/341; 370/329
(58) Field of Classification Search .............. 455/452.1, 455/452.2, 453
See application file for complete search history.

(56) References Cited

U.S. PATENT DOCUMENTS

| | | | |
|---|---|---|---|
| 5,794,157 | A | 8/1998 | Haartsen |
| 5,884,145 | A | 3/1999 | Haartsen |
| 5,963,848 | A | 10/1999 | D'Avello |
| 6,002,676 | A | 12/1999 | Fleming |
| 6,535,742 | B1 | 3/2003 | Jiang et al. |
| 6,941,140 | B2 | 9/2005 | Tateson |
| 7,016,684 | B2 | 3/2006 | Cave et al. |
| 7,376,099 | B2 | 5/2008 | Tseng et al. |
| 2003/0087645 | A1 | 5/2003 | Kim et al. |
| 2003/0181211 | A1 | 9/2003 | Razavilar et al. |
| 2003/0236064 | A1 | 12/2003 | Shiohara et al. |
| 2004/0039817 | A1* | 2/2004 | Lee et al. ................ 709/225 |

(Continued)

FOREIGN PATENT DOCUMENTS

| | | |
|---|---|---|
| EP | 1 206 070 | 5/2002 |
| WO | 03/081848 | 10/2003 |

*Primary Examiner*—Charles N Appiah
*Assistant Examiner*—Randy Peaches
(74) *Attorney, Agent, or Firm*—Volpe and Koenig, P.C.

(57) ABSTRACT

A wireless communication method and system for optimizing channel selection for an AP. The channel selection optimization process includes four sub-processes: (1) a measurement process; (2) a candidate channel determining process; (3) a channel selection process; and (4) a channel update process. Candidate channels used for supporting communication performed by the AP are determined. The candidate channels are chosen from an allowable channel set (ACS) if a detected interference of each candidate channel is less than an established maximum allowed interference.

18 Claims, 4 Drawing Sheets

U.S. PATENT DOCUMENTS

| | | |
|---|---|---|
| 2004/0166870 A1 | 8/2004 | Backes |
| 2005/0083962 A1 | 4/2005 | Khun-Jush et al. |
| 2005/0090250 A1 | 4/2005 | Backes |
| 2005/0128977 A1 | 6/2005 | Kwak et al. |
| 2006/0025150 A1 | 2/2006 | Kim et al. |
| 2006/0211440 A1 | 9/2006 | Nomiya et al. |

* cited by examiner

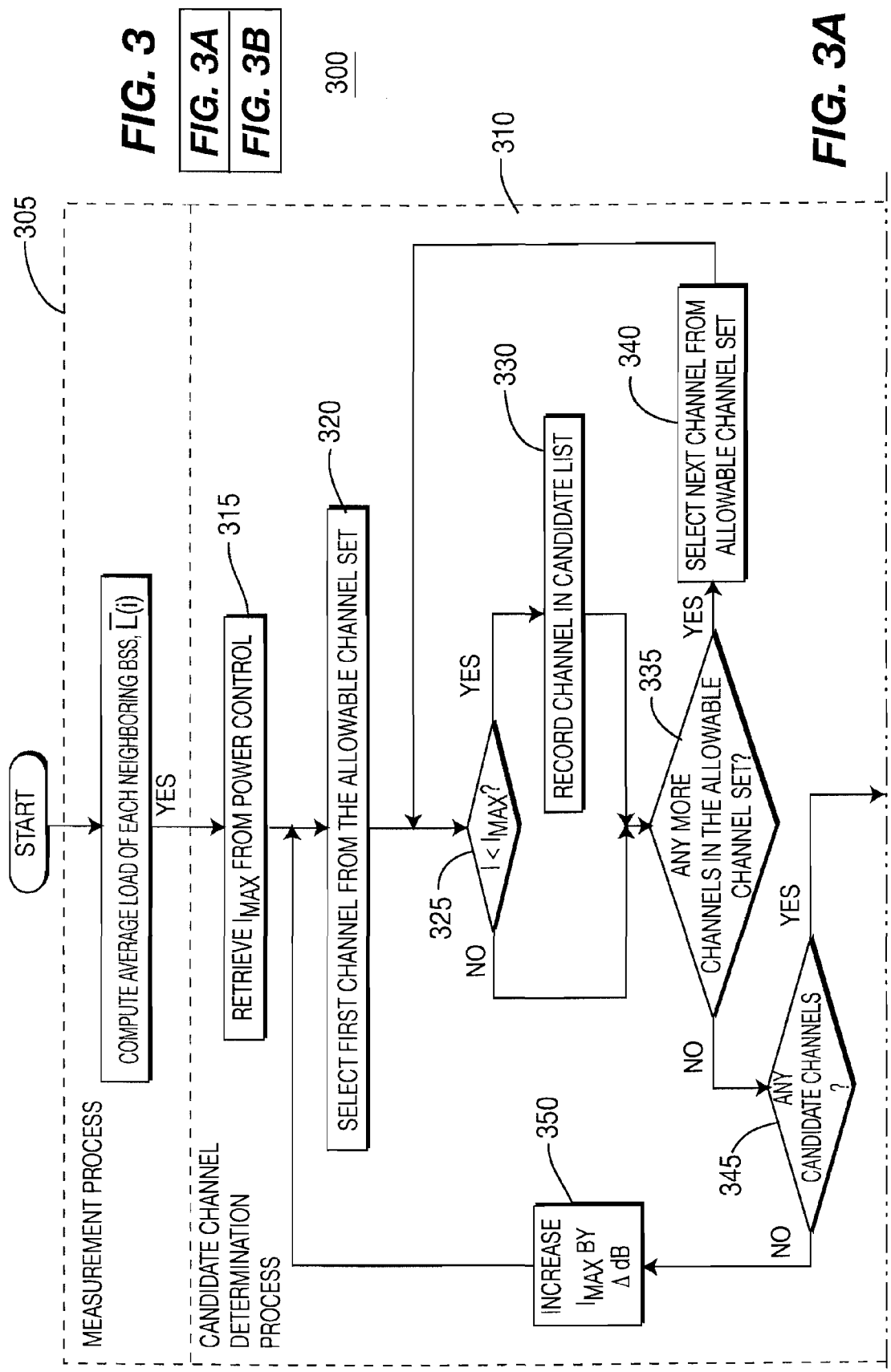

INTEGRATED CIRCUIT FOR OPTIMIZING ACCESS POINT CHANNEL SELECTION

CROSS REFERENCE TO RELATED APPLICATIONS

This application is a continuation of U.S. patent application Ser. No. 11/489,043, filed on Jul. 18, 2006, which is a divisional of U.S. patent application Ser. No. 10/983,207, filed on Nov. 5, 2004, now U.S. Pat. No. 7,454,214, issued on Nov. 18, 2008, which claims the benefit of U.S. Provisional Application No. 60/526,134, filed on Dec. 1, 2003, and U.S. Provisional Application No. 60/535,447, filed on Jan. 8, 2004, which are incorporated by reference as if fully set forth.

FIELD OF INVENTION

The present invention relates to a wireless communication system. More particularly, the present invention relates to selecting the most appropriate operating channel for an access point (AP).

BACKGROUND

The conditions of a radio link under which a wireless communication system operates may change at any time. Since a wireless transmit/receive unit (WTRU) is mobile, the WTRU may be out-of-range, or within range of one or more APs depending upon the position of the WTRU.

The capacity of a communication system is sometimes limited due to bandwidth considerations. The bandwidth capacity of the communication channel, or channels, available to the communication system to communicate data is finite, and must be shared among a plurality of APs and portable WTRUs.

There are several current schemes that are employed in order to increase the capacity of a wireless communication system. Channel, i.e., frequency, selection is one of such schemes, whereby one or more APs in a network select one or more channels to communicate with their associated WTRUs. Coordination of AP channel selection is usually performed manually. However, it is very impractical to manually coordinate channel selection in response to every small change in the network configuration since it may cause a redesign and reconfiguration of all APs. Unlicensed spectra and external sources of interference also raise problems that are not adequately addressed by manual coordination. Moreover, it is difficult for manual channel selection to assign channels such that the traffic loads of neighboring APs are shared among the available channels in a way that maximizes overall system capacity.

Another problem with prior art schemes is encountered when a multiple APs attempt to power-up simultaneously. When this occurs within a network, all of the APs try to make a channel selection at the same time. Thus, the channel selection by the APs would not be optimal since each AP does not take into account the channel selection of neighboring APs.

A method and apparatus which automatically optimizes channel selection to avoid the above-mentioned problems associated with known manual channel selection processes would be greatly beneficial.

SUMMARY

The present invention is related to a wireless communication method and apparatus for optimizing channel selection for an AP. The apparatus may be an AP and/or an integrated circuit (IC).

The channel selection optimization process includes four sub-processes: (1) a measurement process; (2) a candidate channel determining process; (3) a channel selection process; and (4) a channel update process. Candidate channels used for supporting communication performed by the AP are determined. The candidate channels are chosen from an allowable channel set (ACS) if the detected interference of each candidate channel is less than an established maximum allowed interference.

BRIEF DESCRIPTION OF THE DRAWINGS

A more detailed understanding of the invention may be had from the following description, given by way of example and to be understood in conjunction with the accompanying drawings wherein:

FIGS. 3A and 3B, taken together, are a detailed flow diagram of a channel selection process in accordance with another embodiment of the present invention.

DETAILED DESCRIPTION OF THE PREFERRED EMBODIMENTS

Hereafter, the terminology "WTRU" includes but is not limited to a user equipment (UE), mobile station, fixed or mobile subscriber unit, pager, or any other type of device capable of operating in a wireless environment.

Hereinafter, the terminology "AP" includes but is not limited to an access point, a base station, Node-B, site controller, or any other type of interfacing device in a wireless environment.

The features of the present invention may be incorporated into an IC or be configured in a circuit comprising a multitude of interconnecting components.

The present invention as described herein, is generally applicable to wireless local area network (WLAN) technologies, as applied to the IEEE 802.11 and ETSI HyperLAN specifications in general, but may also be applicable to other interference-limited wireless systems such as IEEE 802.15 and IEEE 802.16.

Figure 1:
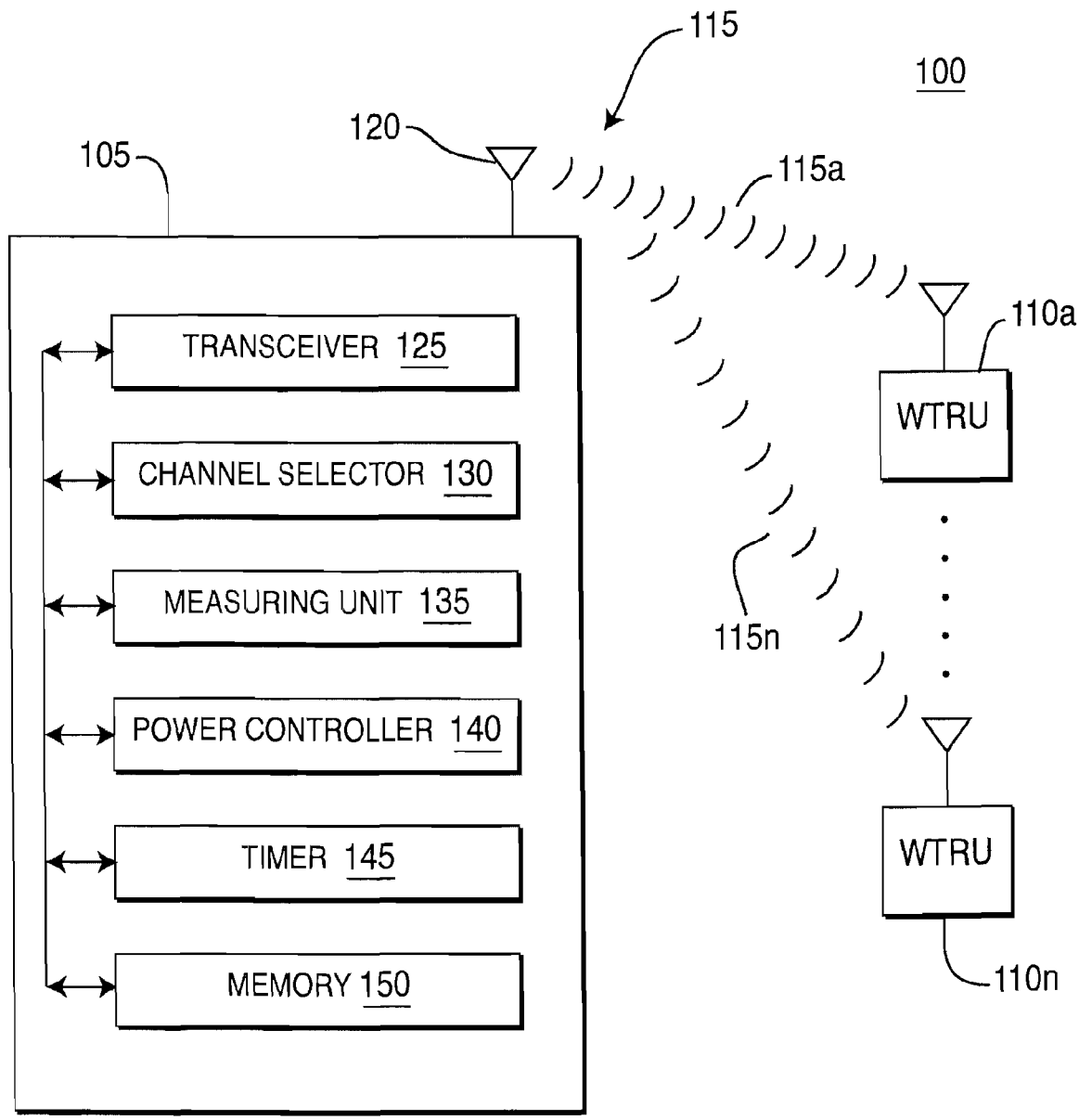
FIG. 1 is a block diagram of a wireless communication system in accordance with the present invention.

FIG. 1 is a block diagram of a wireless communication system 100 according to the present invention. The wireless communication system 100 comprises an AP 105 and a plurality of WTRUs 110a-110n. The AP 105 communicates with the WTRUs 110a-110n over a wireless link 115 via an antenna 120. The AP 105 includes a transceiver 125, a channel selector 130, a measuring unit 135, a power controller 140, a timer 145 and a memory 150. The transceiver 125 transmits signals 115a-115n to, and receives signals 115a-115n from, the WTRUs 110a-110n via the antenna 120.

The channel selector 130 selects a channel which is used for communication with each WTRU 110a-110n. The measuring unit 135 measures operating parameters for supporting the AP 105. The measuring unit 135 is responsible for collecting, processing and storing channel measurements including, but not limited to: the channel utilization, (i.e., the percentage of time that the channel is busy), the level of external, (non-802.11), interference, the received signal strength measured on received packets, and the like. The power controller 140 controls the transmission power of the AP 105. The timer 145 sets one or more predetermined periods during which the AP 105 performs certain operations.

The memory 150 provides storage for the AP 105, including recording data such as results of the measurements.

Figure 2:
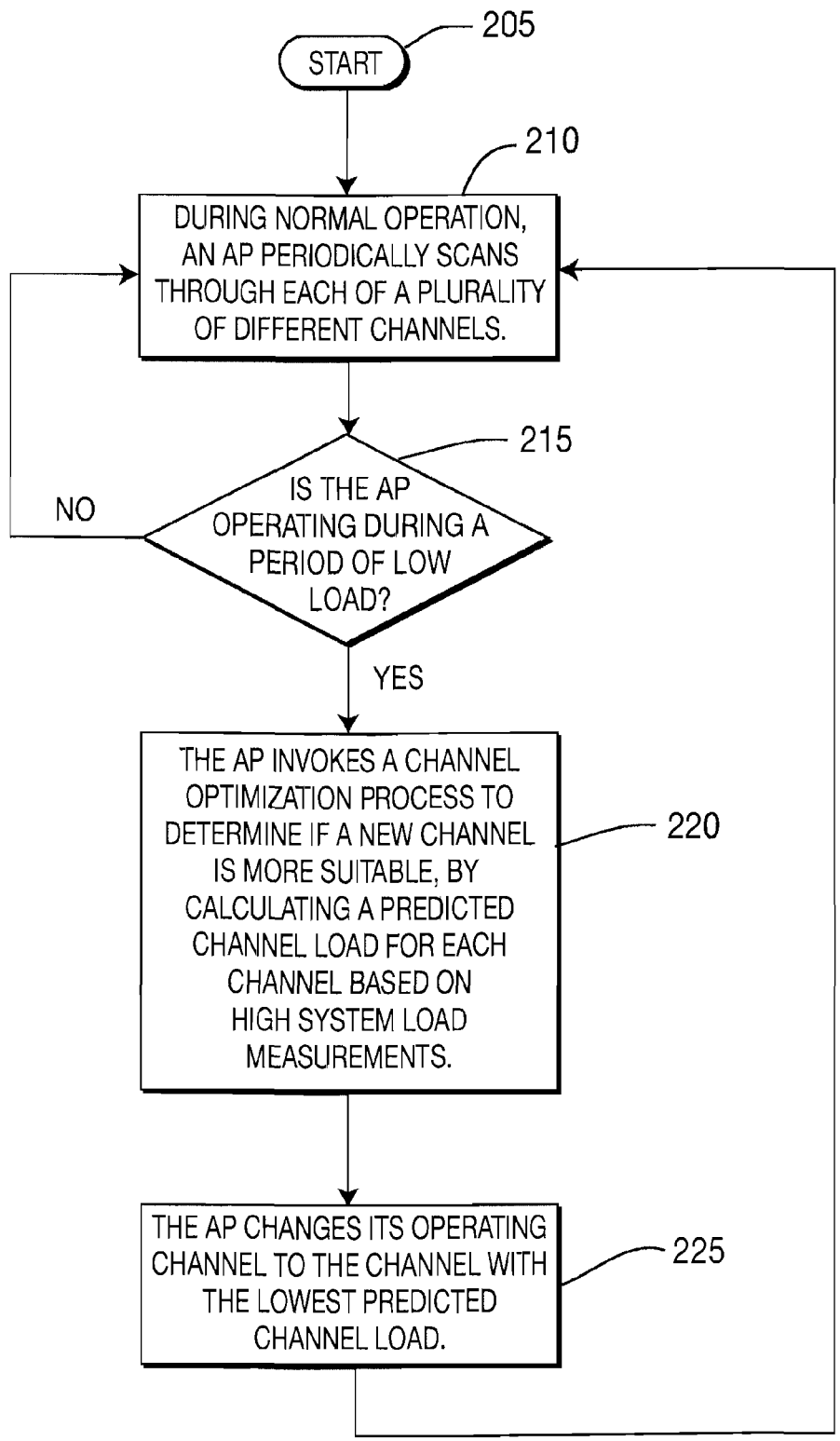
FIG. 2 is a flow diagram of a channel optimization process according to one embodiment of the present invention.

FIG. 2 is a flow diagram of the channel optimization process 200 according to the present invention. Channel optimization refers to the process of choosing the best channels, (i.e., frequencies), that a particular AP or a network of APs uses under particular traffic conditions. Channel optimization may be implemented either manually or automatically, and can be initiated at deployment or performed dynamically during operation. The channel optimization process 200 may be implemented in conjunction with wireless local area network (WLAN) applications, e.g., in accordance with IEEE 802.11.

As shown in FIG. 2, the channel optimization process 200 begins at step 205. The channel optimization process 200 dynamically determines the optimal operating channel during the normal system operation, without experiencing a service disruption to associated WTRUs in the BSS. In step 210, the AP 105 periodically scans through each of a plurality of channels, for short periods of time, to avoid service disruption to its associated users, and to take measurements on these channels. If, in step 215, it is determined that the AP is operating in a period of low load, i.e., no BSS traffic and/or no associated users, the AP 105 invokes the channel optimization process to determine if a new channel is more suitable by calculating the "predicted channel load" for each channel based on measurements taken during a high system load (step 220). In step 225, the AP 105 changes its operating channel to the channel with the lowest predicted channel load.

In current IEEE 802.11 networks, there is no mechanism for the AP 105 to notify associated WTRUs 110 of a change of operating channel, (at least not in the basic standard). If an AP 105 changes channel, each of its associated WTRUs 110 will eventually realize that they have lost communication with the AP 105, and will eventually begin a search for a new AP. They will probably reselect the same AP on its new operating channel. The problem, however, is that the WTRUs will perceive a service interruption from the time they lose communication with the AP to the time they re-associate with it on the new channel. In order to avoid service interruption, channel optimization process 200 waits until there is no traffic in the BSS (cell) to change channels. On the other hand, some versions of the IEEE 802.11 standard, (namely IEEE 802.11h and possibly a future version of the standard), may allow for the AP to signal to its WTRU to change channels. In this case, the channel optimization process 200 does not have to wait until there is no BSS traffic. Thus, the channel optimization process 200 can be run periodically and change operating channels whenever needed.

In all cases, the channel optimization process 200 scans a sequence of channels, (e.g., a list of channels 1-11), to detect the best channel available. The channels may be scanned in a predetermined order, or the channels may be scanned randomly. It is important to note that the channel scanning does not start when there is no BSS traffic. The channel scanning occurs continuously throughout the normal operation of the AP 105. For example, every 0.5 seconds the AP 105 may listen to a different channel for 5 ms. The AP may repeat this periodically, each time scanning a different channel. By doing so, the AP 105 steals 1%, (5 ms every 500 ms), of the medium time to scan other channels, resulting in very little impact to the associated users. The channel sequence does not need to include all available channels. Information associated with each AP detected on each channel is recorded. This information may include, but is not limited to, the identity of other APs which are operating on the scanned channel, an indication of whether other APs are part of the same ESS, the signal strength of the APs, the amount of traffic on the channel and whether there are any other sources of interference on the channel.

For each channel scanned, the process determines: (1) what other APs are operating on that channel; (2) whether the APs are part of the same system (i.e., according to the ESS); (3) the signal strength of the APs; (4) the amount of traffic on the channel; and (5) if there are any other sources of interference on the channel (e.g., non-802.11 interference). The amount of traffic on the channel is typically measured in terms of channel utilization, which corresponds to the percentage of time that the receiver is carrier locked by a WLAN signal.

The scanning is periodic and continuously occurs. Once the channel optimization process is triggered, (i.e., when there is no BSS traffic and/or no associated users, or simply a periodic triggering mechanism, e.g., every 5 minutes), the AP 105 determines which channel provides the best performance. This may be determined, for example, by measuring which channel has the least amount of interference or whether other APs are part of the same ESS. Depending on whether the other APs detected are part of the same system, the AP can be more or less aggressive when choosing which channel to use.

In an alternate embodiment, coordinated channel selection may be accomplished by: (1) having APs exchange information with each other about their properties (e.g. load, capabilities or position); or (2) having a centralized scheme that can obtain information from each AP, and setting the channel of all APs in the network. For the first case, the decision is still made autonomously by each AP, but the information exchanged can allow a better decision, (e.g., it can include statistics that are difficult to observe externally by another AP). For the second case, information is gathered from the different APs and communicated to a centralized unit or device, which upon reception of the information takes a decision and communicates the decision back to the different APs.

The channel optimization process 200 is performed to choose an optimal channel, (e.g., a less loaded channel), while a current channel is being used. The channel optimization process 200 may be triggered by one of several conditions: (1) when the last execution of the optimization channel selection occurred at least $T_{Last}$ seconds ago; (2) when there are no WTRUs currently associated with the AP; or (3) when there has been no BSS traffic to or from the AP in the last $T_{Free}$ seconds. Accordingly, $T_{Last}$ is the minimum elapsed time since the last invocation of any of the channel selection processes for triggering the channel optimization process 200; and $T_{Free}$ is the minimum elapsed time since the last BSS packet transfer to or from the AP for triggering the channel optimization process 200.

The channel optimization process 200 does not disrupt any ongoing data transfers such as a voice call, web download, and/or FTP transfers, by ensuring in the aforementioned triggering conditions that there is no BSS traffic for at least $T_{Free}$ seconds prior to triggering optimization channel selection and that there are no WTRUs currently associated with the AP 105. On the other hand, if there is a way for the AP 105 to signal a change of a channel to its associated WTRUs 110, the optimization channel selection process 200 may run periodically without having to wait for the absence of BSS traffic.

Figure 3B:
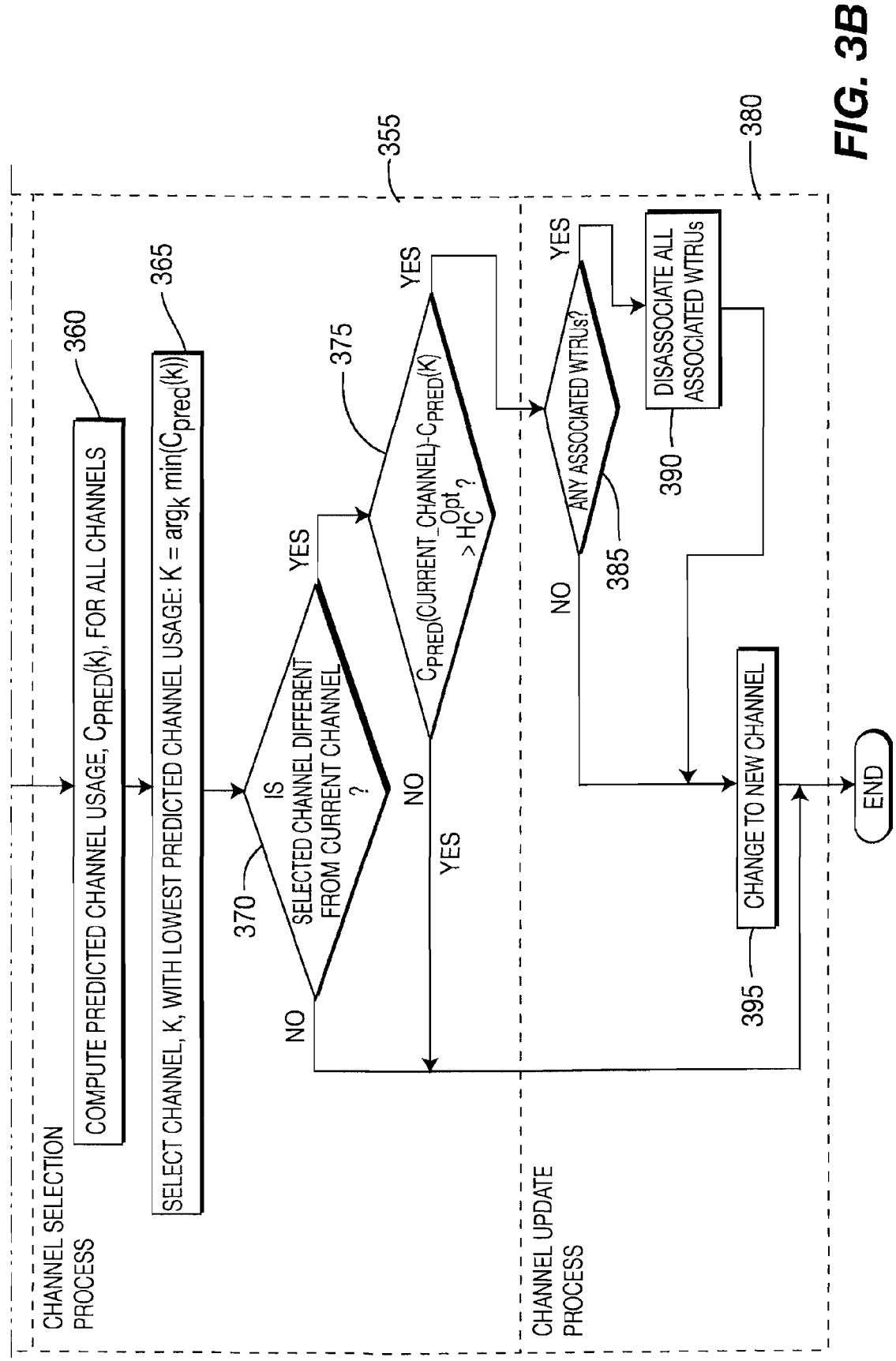

FIGS. 3A and 3B, taken together, are a detailed flow diagram of a channel optimization process 300 according to the present invention. The channel selection optimization 300 includes four sub-processes: (1) a measurement process 305; (2) a candidate channel determining process 310; (3) a channel selection process 355; and (4) a channel update process 380.

In the measurement process 305, the average load of each neighboring BSS, $\bar{L}(i)$, is computed. In one embodiment, the measuring unit 135 periodically estimates the load of each neighboring BSS. If any load estimate of a BSS is greater than $L_{MIN}$, the loads of all neighboring BSSs of the estimation period are recorded in the memory 150. If all BSSs have load estimates that are less than $L_{MIN}$, the load estimates are ignored. Only the latest $N_{load\_est}$ sets of load estimates are kept in the memory 150.

In accordance with the preferred embodiment, the AP 105 listens to one particular channel of an ACS at each silent measurement period (SMP). The AP 105 cycles through each channel in consecutive SMPs, and measures an individual measurement set for each channel in the ACS. The measurement set contains as many SMPs as there are channels in the ACS. In a given SMP, the channel utilization (CU) of the channel is measured by the measuring unit 135. The CU corresponds to the percentage of the time that the transceiver 125 is carrier locked. Since CU is observed during an SMP, all packets that cause the AP 105 to carrier lock originate from neighboring BSSs. The CU measurement represents the out-of-BSS channel usage. Individual CU measurements are processed in order to obtain an average BSS load per detected BSS, $\bar{B}$. Note that the BSS IDs of all BSSs on the channel are recorded along with each channel utilization measurement.

Only high load measurements are recorded in order to avoid unnecessary logging. Logging corresponds to the recording or storing of measurements. As described earlier, the channel optimization process 300 only runs when there is no BSS traffic, i.e., the system is not loaded. In order to reduce the number of recorded measurements, the channel optimization process 300 only stores a pre-determined number of high-load measurements.

The measurements for which CU is less than $C_{MIN}$ are eliminated in order to ensure that channel optimization is based on measurements taken under a significant system load. In other words, if any of the CU measurements performed in one measurement set is greater than $C_{MIN}$, the entire measurement set is recorded. On the other hand, measurement sets for which all channels have a CU<$C_{MIN}$ are ignored. The measurement set may be CU for each channel and the BSS IDs of all BSSs on the channel.

The channel optimization process 300 determines the best channel for its own BSS based on individual channel utilization measurements. Although channel optimization should be based on measurements taken under significant system loads, the channel optimization process 300 can be executed only when the system load has lightened. In order to avoid extensive measurement logging, only the last $N_{SET}$ of measurement windows are kept in memory.

Referring back to FIG. 3A, in the measurement process 305, the average load of each BSS is calculated based on the individual load of a BSS. The instantaneous load of BSS i, operating on channel k during measurement set j, based on Equation (1) as follows:

$$L(i,j) = \frac{C(k,j)}{N_{BSS}(k,j)}; \quad \text{Equation (1)}$$

where C(k,j) represents the channel utilization and $N_{BSS}$(k,j) represents the number of BSSs on channel k during measurement set j. The average load of BSS i is computed as the average of the instantaneous load over all recorded measurement sets, based on Equation (2) as follows:

$$\bar{L}(i) = \max\left(1\%, \frac{1}{N_{SET}} \sum_{j=1}^{N_{SET}} L(i,j)\right); \quad \text{Equation (2)}$$

where $N_{SET}$ represents the total number of recorded measurement sets. A minimum average BSS load of 1% is imposed. The methods of computing the average load of each BSS are not limited to the above examples.

Exemplary parameters for the alternative measurement are listed in the following Table 2. As those of skill in the art would realize, other parameters and values may be used in addition, or in place of, these parameters and values.

TABLE 2

| Symbol | Description | Type | Default Value |
|---|---|---|---|
| C(k, j) | The channel utilization on channel k during measurement set j. The channel usage of a channel is defined as the percentage of time that the receiver is "carrier locked". This measurement is taken during a silent measurement period; all packets that are received at the AP originate from neighboring BSSs. C represents the out-of-BSS channel usage. | Measurement | NA |
| $C_{MIN}$ | The minimum channel usage above which a measurement set is recorded. | Configuration parameter | 10% |
| $N_{SET}$ | The size of the moving window of measurement sets that are kept in memory. | Configuration parameter | 100 |

In the candidate channel determination process 310, the AP 105 retrieves the maximum allowed interference $I_{MAX}$ (step 315), which is the maximum allowed interference on any given channel determined based on the baseline range of an AP. Preferably, $I_{MAX}$ for the candidate channel determination process 310 is calculated based on Equation (3):

$$I_{MAX} = P_{MAX} - (RNG_{base} + RNB_{adn}) - (C/I)_{req\_high} - M_1; \quad \text{Equation (3)}$$

where ($RNG_{base}$+$RNG_{adj}$) represents the range covered by the AP and $(C/I)_{req\_high}$ is set to the required carrier power to interference ratio of a high rate packet, (e.g., 11 Mbps). A margin, $M_1$, is subtracted to eliminate channels with interference levels too close to the actual maximum allowed level.

A first channel is selected from the ACS (step 320). The interference I of the channel is then measured and compared with the maximum allowed interference $I_{MAX}$ (step 325). If the interference I of the channel is less than the maximum allowed interference $I_{MAX}$, the AP 105 records the channel in a candidate list in memory 150 (step 330). If the interference I of the channel is not less than the maximum allowed interference $I_{MAX}$, the AP 105 checks whether any more channels in the ACS exist (step 335). If more channels exist, the AP 105 selects next channel from the ACS (step 340) and the process 300 returns to step 325. If more channels do not exist in the ACS, the AP 105 checks whether any candidate channel is available (step 345). If, in step 345, it is determined that no candidate channel is available, the AP 105 increases $I_{MAX}$ by ΔdB (step 350), and the channel optimization process 300 returns to step 320. If, in step 345, at least one candidate channel is determined to exist, the channel selection process 355 is performed, as shown in FIG. 3B.

The channel selection process 355 is based on the average load, $\overline{L}$ per detected BSS and the current BSS-to-channel mapping, β(k). A predicted channel usage, $C_{PRED}(k)$, for all channels is computed (step 360). $C_{PRED}(k)$ represents the predicted channel utilization on channel k, using load estimates from high load conditions. $C_{PRED}(k)$ may be significantly different from the most recent channel utilization measurements of channel k. It is preferable to base channel selection on $C_{PRED}$ rather than using only latest channel utilization measurements, since channel selection should be optimized for high load conditions.

For each channel, k, the average load of all detected BSSs on channel k are summed based on Equation (4):

$$C_{PRED}(k) = \sum_{\forall i \in \beta(k)} \overline{L}(k).$$  Equation (4)

Once $C_{PRED}$ is calculated for all candidate channels, the channel k with the smallest predicted channel utilization is selected (step 365) based on Equation (5):

$$K = \arg_k \min(C_{PRED}(k)).$$  Equation (5)

At this time, the AP 105 checks whether the selected channel k is different from a current channel (step 370). If the selected channel k with the smallest predicted channel utilization is same as the current channel, the channel selection process 355 ends. If the selected channel k is different from the current channel, it is determined whether there is a significant gain in changing channels (step 375). A hysteresis criterion $H_C^{Opt}$ ensures that there is a significant enough gain in changing channels. Specifically, the new channel is adopted if:

$$C_{PRED}(\text{Current\_channel}) - C_{PRED}(K) > H_C^{Opt};$$  Equation (6)

otherwise, the optimization channel selection ends.

Exemplary parameters for the optimization channel selection are set forth in Table 3. As those of skill in the art would realize, other parameters and values may be used, in addition, or in place of these parameters and values.

TABLE 3

| Symbol | Description | Type | Default Value |
|---|---|---|---|
| ACS | Allowable channel set. | Configuration parameter | {1, 6, 11} |
| $T_{Last}$ | The minimum elapsed time since the last invocation of any of the FS algorithms for triggering Optimization FS. | Configuration parameter | 300 seconds |
| $T_{Free}$ | The minimum elapsed time since the last BSS packet transfer to or from the AP for triggering Optimization FS. | Configuration parameter | 120 seconds |
| L(i) | The estimated load of neighboring BSS i. The load of each BSS is determined every 300 seconds by the Load Balancing process of the Power Control algorithm. | Internal parameter | NA |
| $L_{MIN}$ | The minimum load for measurement logging. If any one BSS has $L(i) > L_{MIN}$, then the load of all detected BSSs is logged. | Configuration parameter | 10% |
| $N_{load-est}$ | The size of the sliding window of recorded load estimates. | Configuration Parameter | 2 |
| β(k) | The set of BSSs detected on channel k. This is a list of the BSSs IDs that have been detected on channel k during recent silent measurement periods. | Measurement | NA |
| I(k) | The interference measured on channel k. I is measured as the average received signal power in the absence of "carrier lock" by the receiver (i.e., the receiver is not receiving any packets). | Measurement | NA |
| $RNG_{base}$ | Baseline Range (set by the Path Loss Discovery process) | Internal parameter | NA |
| $RNG_{adj}$ | Range Adjustment (set by the Load Balancing process) | Internal parameter | NA |
| $(C/I)_{req-high}$ | Minimum required carrier power to interference ratio to support maximum data rate. | Configuration parameter | 10 dB |
| $P_{MAX}$ | Maximum AP transmission power | Configuration parameter | 20 dbm |
| $I_{MAX}$ | The maximum allowed interference on any given channel determined based on baseline range. | Internal parameter | NA |

TABLE 3-continued

| Symbol | Description | Type | Default Value |
|---|---|---|---|
| $M_I$ | Interference margin used in the calculation of the maximum allowable interference level, $I_{MAX}$ | Configuration parameter | 3 dB |
| $\Delta$ | The amount, in dB, by which the maximum allowed interference, $I_{MAX}$, is increased if there are no candidate channels for which $I < I_{MAX}$. | Configuration Parameter | 3 dB |
| $H_C^{Opt}$ | Hysteresis criterion for predicted channel utilization. The difference between the predicted channel utilization of the current channel and the new channel must exceed this threshold. | Configuration parameter | 10% |

A simpler channel selection algorithm may be based upon only on the logged channel utilization measurements, (i.e., by selecting the channel with the lowest channel utilization observed during high load conditions). However, it is likely that neighboring APs have changed operating channels prior to invoking optimization channel selection at a given AP. Logged CU measurements do not accurately represent channel load during the next high load period. As a result, channel selection is based on a prediction of the channel utilization $C_{PRED}$ which is based on the estimated BSS load and the latest BSS-to-channel mapping.

Once the channel selection process 355 is complete, the BSS channel is updated using a channel update process 380 if a new channel is selected. In the channel update process 380, it is determined whether any WTRUs 110 are associated with the AP 105 through the current operating channel (step 385). If so, the AP 105 must first send a disassociation message to each associated WTRU 110 (step 390). The AP 105 then changes its operating channel to the new channel (step 395). If there are no WTRUs 110 associated with the AP 105 through the current operating channel, the AP 105 changes its operating channel to the new channel.

It is preferable that at least $T_{Last}$ seconds elapse since the last execution of the channel optimization process 300. Otherwise, the triggering criterions are ignored. Accordingly, the value of $T_{Last}$ would be the same as the value for the channel optimization process 300. Once $T_{Last}$ has expired since change of channel, the two triggering conditions are evaluated periodically every $T_{MEAS}$.

Although the features and elements of the present invention are described in the preferred embodiments in particular combinations, each feature or element can be used alone or in various combinations with or without other features and elements of the present invention.

What is claimed is:

1. An access point (AP) comprising:
a measuring unit configured to measure operating parameters of each channel in an allowable channel set (ACS) upon activating the AP; and
a channel selector configured to select a channel different than a current operating channel used by the AP for communication with a plurality of wireless transmit/receive unit (WTRUs), wherein the channel selector determines candidate channels based on the measured operating parameters, and selects from the candidate channels a new operating channel by performing the following optimization channel selection process:

computing predicted channel utilization for all of the candidate channels;
selecting a channel from the candidate channels with the smallest predicted channel utilization;
determining if the selected channel with the smallest predicted channel utilization is different than the current operating channel; and
determining whether the channel utilization of the current operating channel is greater than the channel utilization of the selected channel with the smallest predicted channel utilization by at least a predefined threshold, if the selected channel with the smallest predicted channel utilization is different from the current operating channel,
wherein the AP disassociates with any of the WTRUs that are associated with the AP through the current operating channel if the channel utilization of the current operating channel is greater than the channel utilization of the selected channel with the smallest predicted channel utilization by at least a predefined threshold.

2. The AP of claim 1, wherein the measuring unit and the channel selector are incorporated into an integrated circuit (IC).

3. The AP of claim 1, further comprising:
a timer configured to set a time period during which a beacon frame is transmitted from the AP to announce the operating parameters to a plurality of other APs, wherein the beacon frame is transmitted to the other APs at its maximum power during the time period.

4. The AP of claim 1, further comprising:
a memory configured to store the measured operating parameters.

5. The AP of claim 1, wherein the measuring unit measures an average load of each neighboring base service set (BSS) detected on a channel, and the channel selector selects candidate channels based on interference level detected on the candidate channels and selects a new channel among the candidate channels based on the average load.

6. The AP of claim 5, wherein the candidate channels are chosen from the ACS if an interference level of the candidate channels is less than a maximum allowed interference on the candidate channels.

7. The AP of claim 1, wherein the optimization channel selection process is ended if the selected channel with the smallest predicted channel utilization is the same as the current operating channel, or if the channel utilization of the current operating channel is not greater than the channel utilization of the selected channel with the smallest predicted channel utilization by at least a predefined threshold.

8. An integrated circuit (IC) comprising:
a measuring unit configured to measure operating parameters of each channel in an allowable channel set (ACS) upon activating the IC; and
a channel selector configured to select a channel different than a current operating channel used by the IC for communication with a plurality of wireless transmit/receive unit (WTRUs), wherein the channel selector determines candidate channels based on the measured operating parameters, and selects from the candidate channels a new operating channel by performing the following optimization channel selection process:
computing predicted channel utilization for all of the candidate channels;
selecting a channel from the candidate channels with the smallest predicted channel utilization;
determining if the selected channel with the smallest predicted channel utilization is different than the current operating channel; and
determining whether the channel utilization of the current operating channel is greater than the channel utilization of the selected channel with the smallest predicted channel utilization by at least a predefined threshold, if the selected channel with the smallest predicted channel utilization is different from the current operating channel,
wherein the IC disassociates with any of the WTRUs that are associated with the IC through the current operating channel if the channel utilization of the current operating channel is greater than the channel utilization of the selected channel with the smallest predicted channel utilization by at least a predefined threshold.

9. The IC of claim 8, further comprising:
a timer configured to set a time period during which a beacon frame is transmitted from the IC to announce the operating parameters to a plurality of access points (APs), wherein the beacon frame is transmitted to the APs at its maximum power during the time period.

10. The IC of claim 8, further comprising:
a memory configured to store the measured operating parameters.

11. The IC of claim 8, wherein the measuring unit measures an average load of each neighboring base service set (BSS) detected on a channel, and the channel selector selects candidate channels based on interference level detected on the candidate channels and selects a new channel among the candidate channels based on the average load.

12. The IC of claim 11, wherein the candidate channels are chosen from the ACS if an interference level of the candidate channels is less than a maximum allowed interference on the candidate channels.

13. The IC of claim 8, wherein the IC is incorporated in an access point AP.

14. The IC of claim 8, wherein the optimization channel selection process is ended if the selected channel with the smallest predicted channel utilization is the same as the current operating channel, or if the channel utilization of the current operating channel is not greater than the channel utilization of the selected channel with the smallest predicted channel utilization by at least a predefined threshold.

15. A method of selecting at least an optimal channel for use by an access point (AP) having at least an operating channel, the method comprising:
determining a plurality of candidate channels for use by the AP;
selecting from the plurality of candidate channels a channel used for a new operation channel by performing the following optimization channel selection process:
computing predicted channel utilization for all of the candidate channels;
selecting from the plurality of candidate channels a channel with the lowest channel utilization;
determining if the selected channel with the lowest channel utilization is different from a current operating channel; and
determining whether the channel utilization of the current operating channel is greater than the channel utilization of the selected channel with the lowest channel utilization by at least a predefined threshold, if the selected channel with the lowest channel utilization is different from the current operating channel,
determining whether there are any wireless transmit/receive units (WTRUs) associated with the AP through the current operating channel, if the channel utilization of the current operating channel is greater than the channel utilization of the selected channel with the lowest channel utilization by at least a predefined threshold; and
disassociating all of the associated WTRUs.

16. The method of claim 15, further comprising:
computing average loads of each of a plurality of neighboring base service sets (BSSs); and
recording information of the BSS of which average load is greater than a threshold.

17. The method of claim 15, wherein the optimization channel selection process is ended if the selected channel with the smallest predicted channel utilization is the same as the current operating channel, or if the channel utilization of the current operating channel is not greater than the channel utilization of the selected channel with the smallest predicted channel utilization by at least a predefined threshold.

18. An AP configured to perform the method of claim 15.

* * * * *